Aug. 13, 1946.   N. A. TORNBLOM   2,405,927

DRAIN FITTING

Filed Oct. 11, 1944

Inventor:
Nils A. Tornblom,
By: Wm. F. Freudenreich,
Attorney

Patented Aug. 13, 1946

2,405,927

UNITED STATES PATENT OFFICE 2,405,927

DRAIN FITTING

Nils A. Tornblom, Chicago, Ill., assignor to Appleton Electric Company, a corporation of Illinois Application October 11, 1944, Serial No. 558,213

5 Claims. (Cl. 138—42)

Water often collects in boxes of various kinds and conduits for wires in distributing systems for electricity and does harm if it is not removed. A simple little hole at a low point in a box to be drained will serve to permit water to escape but, in many situations, this expedient cannot be adopted because of fire hazard—flame as well as water being able to pass through such a hole. This has led to the creation of fittings which will permit the escape of water and yet be "flame tight." The most common type of such a fitting is based on the idea of a screw extending up through a wall at the bottom of a space to be drained and being such a loose fit that water can flow out along the threads. In order for such a device to be "flame tight" the escape passage must extend along many turns of the screw thread, the downward slope being so gradual that water does not flow freely and dirt entering the passage stays there instead of being washed away.

The object of the present invention is to produce a simple and novel "flame tight" drain fitting in which the principle of a helical outlet passage is utilized, but in such a manner that the escape path is relatively short and steep and permits a flow of water in relatively large volume.

Figure 1:
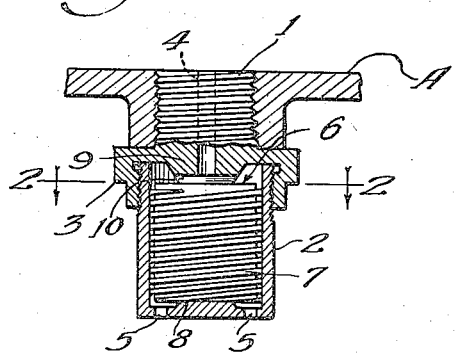
Figure 3:
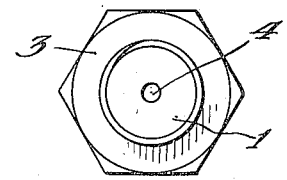
Figure 2:
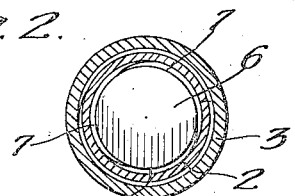
Figure 4:
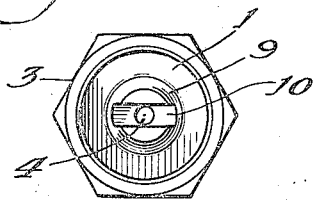
Figure 5:
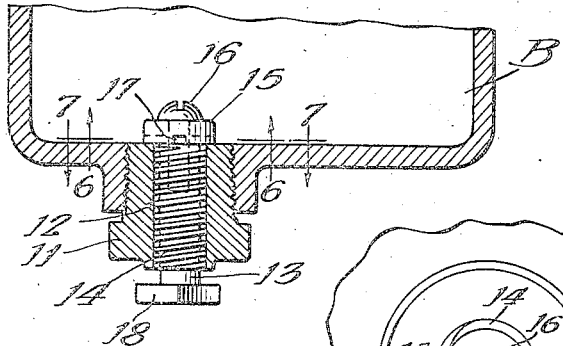
Figure 6:
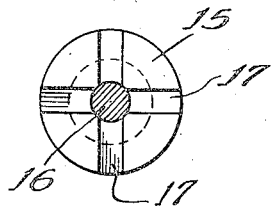

For a full understanding of the present invention and of its objects and advantages, reference may be had to the following detailed description taken in connection with the accompanying drawing, wherein:

Figure 1 is an axial section through a fitting embodying my invention, along with a fragment of a box to which the fitting is applied; Fig. 2 is a section on line 2—2 of Fig. 1; Fig. 3 is a top view of the fitting; Fig. 4 is a bottom view of the upper member of the two part plug; Fig. 5 is a section, similar to Fig. 1, showing a modification; Fig. 6 is a section on line 6—6 of Fig. 5; and Fig. 7 is a section on line 7—7 of Fig. 5.

Referring to Figs. 1-4 of the drawing, 1 and 2 are the upper and lower members of a two part plug. The member 1 is a solid body having an upper part adapted to be screwed into a hub or downward projection on a box A; while the lower portion is in the form of an enlargement having an internally screwthreaded flange 3 on the under side. The member 2 is a cylindrical cup the open end of which is screwed into the lower end of member 1. The member 1 has a central hole 4 drilled through the same from top to bottom, and the member 2 has holes 5 in the bottom wall for the escape of water. A solid cylindrical part 6 fits slidably in the cup and is provided with external, multiple screw threads 7, a triple thread providing valleys about one thirty-second of an inch having been found satisfactory. The element 6 is preferably lightly clamped between the two members of the plug, the parts being so arranged, however, that water flowing down through the upper member of the plug can readily enter the upper ends of the valleys between the lands of the screw threads 7 and thereafter flow freely out of the lower ends of these valleys and drain out of the cup through the holes 5. In the arrangement shown, the cylindrical element rests on a central boss 8 on the bottom wall of the cup, thus providing an annular chamber or free space in the bottom of the cup above the holes 5 and below the lower ends of the valleys spiralling around the cylindrical element. Also, the upper member of the plug has at the bottom a central boss 9, contacting the top of the element 6 and provided in its under face with a wide, deep groove 10 extending diametrically across the same so as to be in communication with the lower end of the hole 4 in the upper member of the plug.

By using a triple thread, there is obtained the effect of a valley or passage having three times the cross sectional area afforded by the valley of a single thread and, furthermore, the pitch of the valleys is much steeper. This last characteristic is important because, in order to be explosion proof or "flame tight," must be of small area in cross section and, if the slope or pitch be too gradual, the water will bind in the valleys and will not drain away properly. Should foreign matter get into the valleys and clog the same, the cup need only be unscrewed to permit the element 6 to be removed and cleaned.

Figure 7:
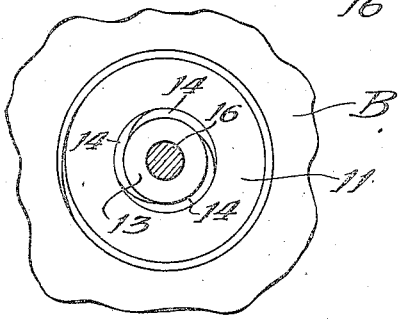

In Figs. 5-7 I have shown a smaller fitting in which there is a simple plug 11 adapted to be screwed into the bottom of a box B or the like and having an axial, smooth bore 12 larger in diameter than the hole 4 in the upper member 1 of the plug in the other form. The cylindrical element 13 is a sliding fit in and extends through this bore from top to bottom, and is provided with an external triple screw thread 14 in which the valleys are of the same width and depth as are those on element 6. The part 13 is held against dropping out by a head on its upper end. This head may conveniently be a thick disk 15, larger in diameter than the bore 12, held in place by a screw 16, passing through the same and into the upper end of the cylindrical element 13. In the under face of the disk are deep, wide grooves 17, that permit water in the box to flow through the same, when the marginal portion of the disk rests on the bottom of the box; the water thus finding its way into the upper ends of the valleys between the lands of screw threads 14. The part 13 is preferably a little longer than the plug so as to project somewhat below the lower end of the latter. On the lower end of the element 13 is a head 18, preferably integral therewith, that makes it impossible for the element to be pushed out through the top of the plug.

This device operates in the same manner as that previously described, to drain water from the box. Because the element 13 is longer than the plug it may be jiggled up and down from time to time, without opening the box, to clear the valleys, if the flow of water therethrough be sluggish.

While I have illustrated and described with particularity only two specific forms of my invention, I do not desire to be limited to the exact structural details so illustrated and described; but intend to cover all forms and arrangements which come within the definitions of my invention constituting the appended claims.

I claim:

1. Means for draining a chamber in a member, which comprises a body having a long smooth bore, a long cylindrical element fitting said bore and having multiple screw threads on the same, parts on the ends of said element to hold it against removal from said bore; said parts each having a transverse dimension greater than the diameter of said bore, the upper part being shaped to leave the upper ends of the valleys in the screw threads open, and there being normally an outlet from the lower ends of said valleys between the lower of said parts and the bottom of said member.

2. A means as set forth in claim 1, wherein the distance between the parts on the ends of the cylindrical element are spaced farther apart than the length of said bore, whereby said element is left free to be moved up and down through a limited distance.

3. A drain fitting consisting of a plug having a smooth central bore, a cylindrical element fitting slidably in said bore and having multiple external screw threads, a disk larger in diameter than said bore overlying and detachably connected to the upper end of said element, and there being channels in the under side of said disk to permit water to enter the upper ends of the valleys between the screw threads when the disk lies on the upper face of the plug.

4. A device as set forth in claim 3, wherein the cylindrical element is longer than the plug and has on its lower end an enlargement to prevent it from being lifted up through the plug.

5. Means for draining a chamber in a member, which comprises a body having a long, smooth bore, a long, cylindrical member fitting slidably in said bore and projecting down below the lower end of the latter, and parts on the ends of said cylindrical member to hold it against withdrawal from the said bore, while permitting it to be lifted through a limited distance by upward pressure in the upward direction against its lower end, and there being multiple external screw threads on said cylindrical member; the part at the upper end of said cylindrical member normally resting on the bottom of the chamber and being shaped to leave the upper ends of the valleys in the screw threads open at all times, and the part on the lower end of the cylindrical member being normally spaced apart from the bottom of the member containing the bore.

NILS A. TORNBLOM.